United States Patent [19]
Hammond

[11] Patent Number: 5,228,819
[45] Date of Patent: Jul. 20, 1993

[54] LEVEL GRAVITY CONVEYOR

[76] Inventor: Theodore A. Hammond, 6233 St. Ives Blvd., Orlando, Fla. 32819

[21] Appl. No.: 859,221

[22] Filed: Mar. 30, 1992

Related U.S. Application Data

[63] Continuation-in-part of Ser. No. 657,724, Feb. 19, 1991, abandoned.

[51] Int. Cl.⁵ .................................................. B65G 1/06
[52] U.S. Cl. .................................. 414/267; 198/774.4; 414/286
[58] Field of Search ................ 414/267, 276, 286; 198/774.1, 774.2, 774.4

[56] References Cited
U.S. PATENT DOCUMENTS

| | | | |
|---|---|---|---|
| 3,451,532 | 6/1969 | Manterfield | 198/774.4 |
| 3,658,171 | 4/1972 | Fukada | 198/774.4 |
| 4,044,876 | 8/1977 | Hammond | 193/35 SS |
| 4,205,740 | 6/1980 | Hammond | 193/35 A |
| 4,304,521 | 12/1981 | Hammond | 414/276 X |
| 4,673,326 | 6/1987 | Halonen et al. | 414/267 X |
| 4,723,909 | 2/1988 | Rouvet | 198/774.4 |
| 4,759,676 | 7/1988 | Hammond | 414/276 |
| 4,787,803 | 11/1988 | van Elten et al. | 414/267 X |
| 4,793,472 | 12/1988 | Solund | 198/774.4 |
| 5,038,920 | 8/1991 | Light | 198/774.4 |

Primary Examiner—David A. Bucci
Attorney, Agent, or Firm—Flynn, Thiel, Boutell & Tanis

[57] ABSTRACT

A conveyor arrangement, as associated with a storage rack, employs a plurality of individual load-supporting trolleys or pads supported on sloped runway segments which are activated by a cyclically-actuated vertical lifting arrangement, with this arrangement being supported within a rail or frame structure having supporting flanges for the loads. When the lifting device is activated to lift the inclined runway segments and pads upwardly, the loads are lifted away from the supporting flanges, whereby the weight of the loads causes the pads to move downwardly by gravity along the sloped runway segments to forwardly advance the loads a small amount, until the loads again contact the support flanges. When the pads are lowered due to lowering of the lifting arrangement, the pads are biased back to a raised position along the upper end of the runway segments whereby they are again engaged under the load to permit repeat of the cycle.

18 Claims, 8 Drawing Sheets

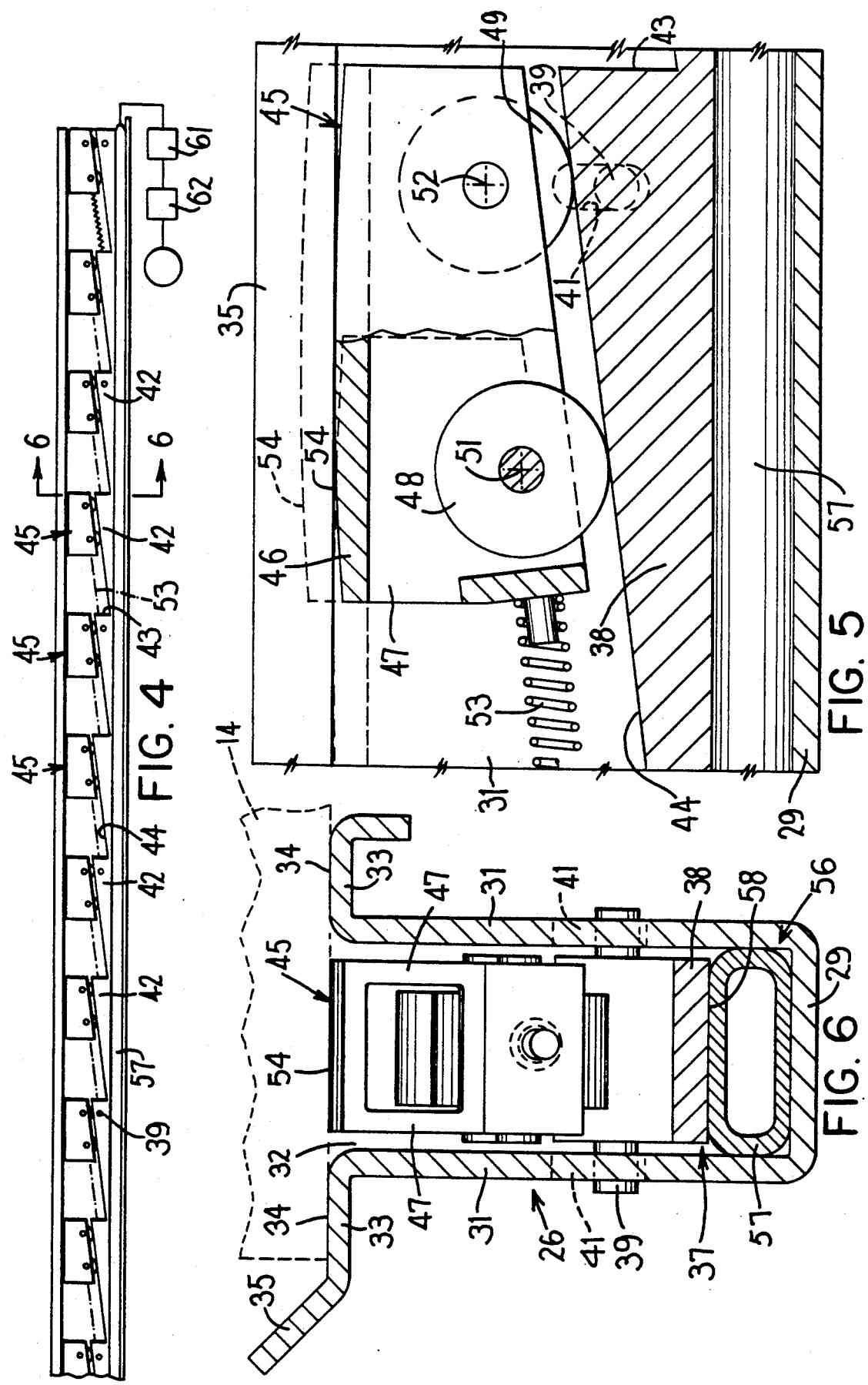

LEVEL GRAVITY CONVEYOR

CROSS-REFERENCE TO RELATED APPLICATION

This application is a continuation-in-part of my copending application Ser. No. 07/657,724 filed on Feb. 19, 1991, now abandoned and is also a continuation-in-part of international application PCT/U.S. Pat. No. 92/01209 filed on Feb. 14, 1992.

FIELD OF THE INVENTION

This invention relates to a gravity-type transporting or conveying system which is desirable for use as part of a first in-first out storage rack arrangement for storage and transporting of palletized loads and, more particularly, to a system which extends horizontally between input and output ends but permits gravity-induced advancing of loads therealong.

BACKGROUND OF THE INVENTION

My earlier U.S. Pat. Nos. 4,205,740, 4,044,876, 4,304,521 and 4,759,676 disclose pulsating gravity-type conveyors which are particularly desirable for conveying palletized loads, and which are also highly desirable for use in storage-rack systems for permitting "first in-first out" storage of palletized loads. In this known conveyor or storage-rack system, the loaded pallets are supported directly on conveyor rollers, which rollers are disposed in longitudinally adjacent relationship and are supported by a carriage or rail structure which enables the rollers to vertically reciprocate in a cyclic or repetitive manner. This arrangement physically causes the palletized loads to be intermittently lifted and lowered relative to a longitudinally extending stationary brake which extends at a slight decline relative to the horizontal. The pallets are stopped by the brake when the pallets and rollers are in their lowered positions, whereas the slope of the roller arrangement enables limited gravity-induced forward advancing of the pallets when the rollers are in their raised positions.

While the known arrangement described above has proven highly successful and desirable for transporting and storing palletized loads, particularly in storage rack arrangements, nevertheless in some storage racks the spacial or size requirements prevent optimum utilization of such systems in terms of permitting maximum utilization in the number of vertically stacked bays, or use of the system due to the extensive length of the individual bays. For example, with known gravity-type systems of the type described above, the slope of the conveyor as it extends longitudinally along the bay typically involves a vertical drop of about six inches for each ten feet of horizontal conveyor length. Since such conveyors when incorporated into storage racks typically extend from a minimum length of about 40 feet to a maximum length of as much as 200 feet, the vertical drop over such lengths can vary from as little as about two feet to about ten feet. Because of this vertical drop, when several bays each incorporating a conveyor are stacked vertically on top of one other, the number of stacked bays is limited not only by the height limitation of the building, but also by the vertical drop caused by the slope of the conveyor. Thus, optimum utilization of available space, particularly vertical height, cannot always be achieved.

The present invention thus represents an improved gravity-type conveyor which enables gravity-type forward advancing of loads over relatively long distances in an incremental or steplike manner while enabling the conveyor in the elongate direction thereof to be substantially horizontal or level, and thereby eliminate the elongate sloped structural relationships normally required with conventional gravity-type conveyors.

The present invention also represents an improved gravity-type conveyor which is believed to improve upon known conveyors of the general type described above by permitting more efficient utilization of vertical height available within a building, and hence permitting utilization of a larger number of vertically stacked bays in a storage rack within the same amount of available vertical space then was previously possible.

More specifically, with the improved arrangement of the present invention, the gravity-type conveying system may be associated with each bay of a storage rack, which bays are stacked vertically one above the other, with several stacks or columns being disposed horizontally adjacent. The individual inventive conveyor as associated with each bay, however, extends horizontally between input and output ends so that a palletized load as positioned on the conveyor at the input end is at the same elevation as the palletized load stored at the output end. The conveyor, however, incorporates a pulsating load-engaging arrangement which enables the loads to be vertically raised and lowered in a pulsating or cyclic manner, and at the same time enables the individual palletized loads to be gravity-urged forwardly along the conveyor through sequential small distances or steps to effect forward advancing of the loads from the input to the output end of the conveyor.

With this improved arrangement, as described above, the overall available height can be more efficiently utilized since the individual bays do not require additional height at one end to compensate for slope inasmuch as the individual conveyors extend horizontally. This enables a greater number of bays to be vertically stacked within a predetermined height, and thus enables higher density storage of palletized loads within a particular building volume.

Further, the improved arrangement results in the input ends of the bays being generally lower than previously possible, and thus facilitates the positioning of loads onto the input ends of the bays. This arrangement also enables the palletized loads to remain horizontal at all times, even during the gravity-urged advancing of the palletized loads along the conveyor. This thus avoids having to tip or tilt the loads, thereby providing greatly improved load stability. This is particularly desirable in situations where the loads are pallets having other objects such as bottles or the like loaded thereon, since the continual horizontal stability of the loads provides greater safety of handling and less tendency for the objects to slip or move off of the pallet.

While the improved level gravity conveyor of this invention is highly desirable for incorporation into storage racks of the general type described above, this improved level gravity conveyor is also highly desirable for use as a conveyor for general load-advancing purposes while permitting such advancing to be performed by gravity while carried out in a safe and controlled manner.

SUMMARY OF THE INVENTION

Briefly summarizing the invention, the improved level gravity conveyor arrangement provides a plurality of individual load-engaging support pads disposed in generally spaced relationship longitudinally along the conveyor. These pads are movably supported on the series of runway segments which also extend longitudinally of the conveyor. Each runway segment defines thereon an upper surface which movably supports the pad, and the runway segments are alternately raised and lowered so that, when in a raised position, the upper surfaces thereof slope downwardly in the forward direction of the conveyor. The pads engage and vertically lift the loads when the runway segments are in the raised position, whereby the weight of the loads causes the pads to move downwardly by gravity along the inclined upper surface to hence forwardly advance the loads through a small distance until the loads reengage a support or brake surface. The pads are normally returned, such as by springs, rearwardly along the runway surfaces when the runway segments are lowered. The runway segments are normally periodically raised and lowered in a cyclic manner to effect a forward steplike advance of the loads longitudinally along the conveyor.

Further, the improved conveyor arrangement, in a preferred construction, and when associated with a storage rack, employs a plurality of individual trolleys or cars supported on sloped runway segments which in turn are supported on a pulsating or cyclically-actuated vertical lifting arrangement, with the complete arrangement being supported on a frame structure having supporting flanges for palletized loads. When the lifting device is activated to lift the inclined runways and cars upwardly, the pallets are lifted away from the supporting flanges, whereby the weight of the pallets causes the cars to move downwardly by gravity along the sloped runways so that the loads are forwardly advanced a small amount until the pallets again contact the supporting flanges. When the cars are lowered due to lowering of the lifting arrangement, the cars are biased back to a position adjacent the upper end of the runway whereby they are again engageable under the pallet so as to permit a repeat of the cycle.

Other objects and purposes of the present invention, including rearrangements of the structure illustrated and described hereinafter, will be apparent to persons familiar with arrangements of this general type upon reading the following specification and inspecting the accompanying drawings.

BRIEF DESCRIPTION OF THE DRAWINGS

FIG. 4 is a side elevational view which diagrammatically illustrates, in the longitudinal extent thereof, a first embodiment of the improved gravity-type conveyor of the present invention.

FIG. 5 is an enlarged, fragmentary sectional view illustrating one of the trolleys associated with the conveyor of FIG. 4.

FIG. 6 is an enlarged sectional view which is taken generally along line 6—6 of FIG. 4.

Figure 1:
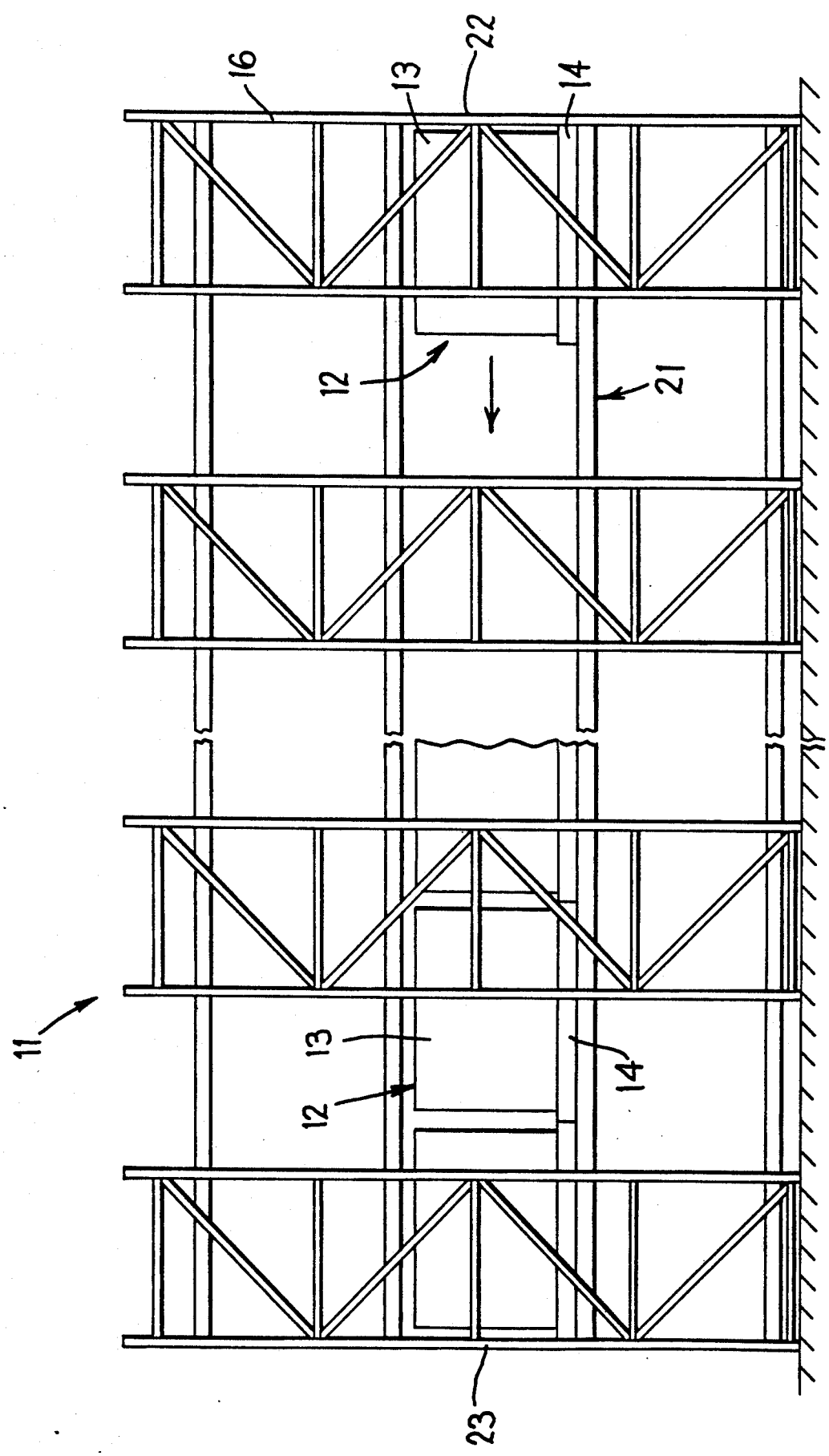
FIG. 1 is a side elevational view of a typical storage rack modified to include the inventive conveyors associated with the individual bays.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will refer to the normal direction of movement of a load along the conveyor, which direction for example is rightwardly in FIGS. 1, 4 and 5. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Embodiment of FIGS. 1-6

Figure 2:
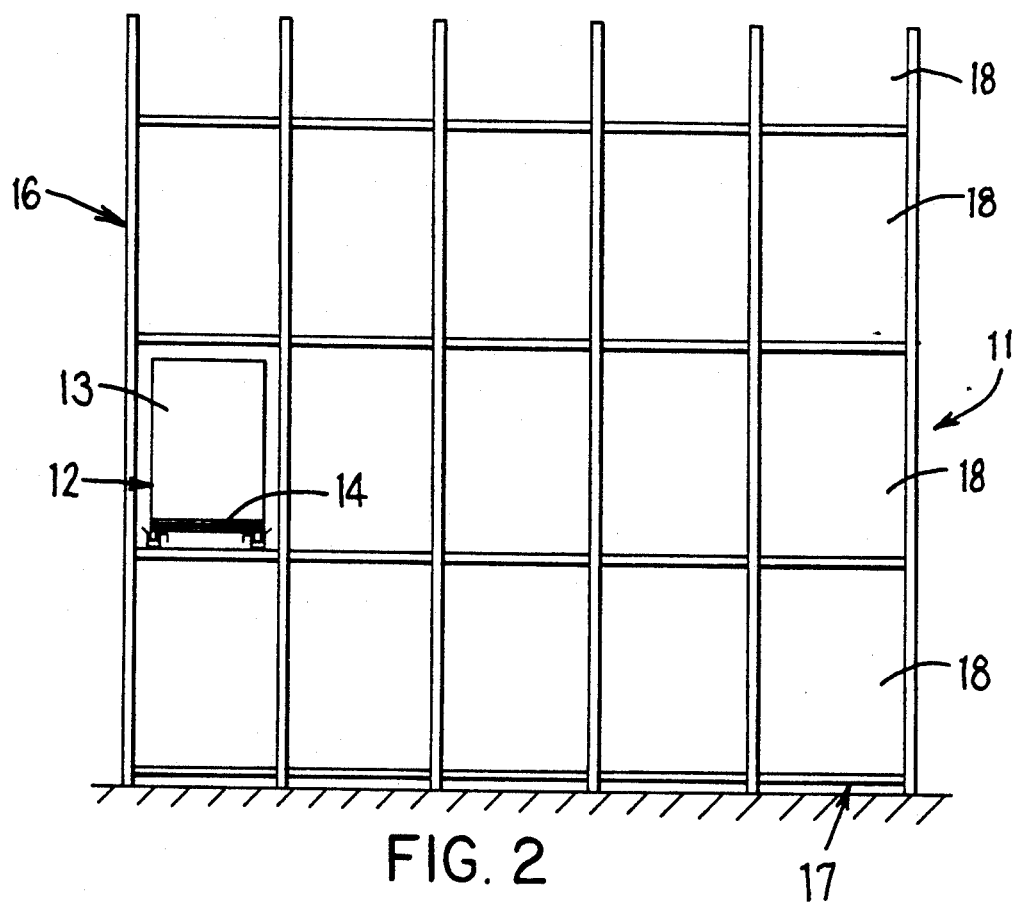
FIG. 2 is a end elevational view of the storage rack which is diagrammatically illustrated by FIG. 1.

FIGS. 1 and 2 illustrate a storing and transporting rack system 11 designed specifically for handling and storing palletized loads 12, which loads in the illustrated embodiment comprise suitable articles or goods 13 stacked on conventional pallets 14. The storing and transporting system 11, in a preferred embodiment, incorporates a rack-type framework 16 which includes a plurality of horizontally adjacent columns 17, each including a plurality of bays or tiers 18 disposed vertically one above the other. Each bay has a gravity-type conveyor or transporter 21 associated therewith and extending longitudinally along the framework from an input end 22 to an output end 23. The conveyor or transport 21 is designed to provide for "first in-first out" storage of palletized loads.

The conveyor or transporter 21, in this illustrated embodiment, includes a pair of generally parallel, sidewardly-spaced, horizontally elongate support rails 26 and 27 which extend longitudinally between the input and output ends of the respective bay. These support rails are identical except for being mirror images of one another, and are suitably fixedly secured to and supported on appropriate transverse frame members 28 associated with the framework 16. These support rails 26 and 27 extend horizontally throughout the length thereof between the input end 22 and the output 23. That is, the support rails are not inclined or sloped, and thus the input and output ends 22 and 23 are at the same elevation.

Each support rail 26 and 27 includes a generally upwardly-opening, U-shaped channel defined by a substantially horizontal bottom wall 29 which fixedly and rigidly joins to the bottom edges of a pair of upwardly projecting and sidewardly spaced side walls 31. The channel defines therein a horizontally elongated channel-like space 32 which opens upwardly. Each side wall 31 has a flange 33 fixed to the upper edge thereof, which flange extends horizontally along the entire length of the support rail and projects horizontally sidewardly in an outward direction (that is, away from the channel-like space 32). The pair of flanges 33 project sidewardly in opposite directions from the upper edges of the channel member, and define thereon upper horizontally-extending surfaces 34 which function as support or brake surfaces for engagement with the underside of the pallets 14. The outermost flange 33, adjacent its outer edge, is also rigidly joined to an edge flange 35 which slopes upwardly at an angle of about 45° as it also projects further outwardly. The pair of edge flanges 35 as defined on the pair of support rails 26 and 27 are hence disposed outermost and function both to sidewardly confine the pallet 14 therebetween, and to effect sideward recentering of the pallet during lowering thereof.

Each of the support rails 26 and 27 mounts therein a load advancing arrangement, such as the arrangement 37 described below, which load advancing arrangement extends longitudinally throughout the length of the respective support rail and is adapted to provide for a gravity-induced incremental or steplike forward advancing movement of the loads from the input end 22 toward the output end 23.

The load advancing arrangement 37 according to this embodiment includes a declining track or runway structure 38 which is horizontally elongated and extends throughout substantially the entire horizontal length of each of the support rails 26 and 27. This runway arrangement 38 is positioned within the channel-like space 32 and is supported on the respective support rail so as to permit limited vertical displacement therebetween, while being restrained from horizontal movement. This is accomplished, in the illustrated embodiment, by a plurality of pins 39 which are fixed to and extend transversely through the runway structure 38 at longitudinally spaced intervals therealong. The opposite ends of the pins 39 project outwardly beyond the runway and are confined within vertically elongate slots 41 formed in the adjacent side walls 31. These slots 41 normally have closed upper and lower ends to permit only limited vertical displacement of the runway arrangement relative to the support rail.

The runway arrangement 38 is defined by a plurality of ramplike segments 42 which are positioned adjacent and fixedly and rigidly connected together so as to extend throughout the horizontal length of the respective support rail 26, 27. Each ramp segment 42 includes a rearwardly facing shoulder 43 which, at its upper edge, joins to an upper declining surface 44 which slopes downwardly at a small angle as it project forwardly (that is, as it projects toward the output end 23). This declining surface 44 preferably slopes downwardly at a small angle, such as a downward slope in the range of about 2° to about 5° relative to the horizontal, with the lowermost and forwardmost end of this declining surface terminating at the shoulder 43 of the next forwardmost adjacent ramp segment 42.

The elongate declining runway structure 38 is preferably formed in lengths which individually comprise a plurality of ramp segments or modules, with the lengths being suitably rigidly secured together using conventional constructional techniques so that the overall runway arrangement, as it extends throughout the length of the support rail, effectively functions as a unitary structure. The individual ramp segments 42 themselves, however, are normally of rather short horizontal length, such as in the neighborhood of about 12 inches.

To permit gravity-urged advancement of loads, the load advancing arrangement 37 also includes a plurality of load-engaging units 45 rollingly supported on the declining runway arrangement 38. In fact, preferably at least one such load-engaging unit 45 is associated with each ramp segment 42.

The load-engaging unit 45 functions substantially as and is formed similar to a trolley or car, and includes a top load-engaging pad or wall 46 which is rigidly joined to a pair of sidewardly-spaced side flanges 47 which project downwardly from the top wall. The side flanges 47 and top wall 46 define a generally inverted channel-like structure which is positioned within the channel-like space 32 in vertical disposition about the runway arrangement 38. Each trolley frame 46-47 is rollingly supported by front and rear rollers or bearings 48 and 49, respectively. These rollers 48 and 49 are confined between the side flanges 47, and are supported for rotation about respective front and rear axes 51 and 52, whereby the rollers are disposed for rolling engagement with the upper declining surface 44 of the respective ramp segment 42. The front and rear axes 51 and 52 are disposed in parallel relationship, and are horizontally and vertically sidewardly displaced, whereby a line extending perpendicularly between the axes 51 and 52 extends in parallel relationship to the declining surface 44.

Each load-engaging unit or trolley 45 is normally urged or biased toward an uppermost position adjacent the upper end of the respective declining surface 44, and this is accomplished in the illustrated embodiment by a conventional compression spring 53 which coacts between the respective trolley and the rearward end of the forwardly adjacent ramp segment.

The trolley 45 defines thereon an upper surface 54 which is adapted to directly contact the underside of the load or pallet 14. This upper surface, which is substantially horizontally straight when viewed from the end, is preferably of an upwardly convex configuration when viewed sidewardly, as illustrated by FIG. 5. This upwardly curved configuration of the upper surface helps to distribute loads, particularly by ensuring that the trolley contacts the load or pallet at a point located somewhere between the front and rear rollers, rather than permitting contact at either the front or rear edge of the trolley.

The load advancing arrangement 37 also includes a reciprocating vertical lifting arrangement 56 which cooperates between the runway arrangement 38 and the respective support rail 26 or 27 so as to effect cyclic raising and lowering of the load advancing arrangement 37. This vertical lifting arrangement 56, in the illustrated embodiment, includes an elongate gas (i.e. air) inflatable hose 57 (such as a fire hose) disposed within the bottom of the respective support rail and extending longitudinally throughout the entire horizontal extent thereof. This inflatable hose 57 is normally supported directly on the bottom wall 29 of the support rail and in turn supports thereon the flat bottom surface 58 of the runway arrangement 38.

The hose 57 is connected to a suitable power source 61, such as an air compressor, the latter being activated and regulated by a suitable control unit 62, such as a conventional time-control valve, so that the hose 57 can be cyclically inflated and deflated in an intermittent yet regulated manner, such as for example approximately 15 to 25 cycles per minute, whereby the load advancing arrangement 37 (that is, the runway arrangement 38 and the load-engaging trolleys 45) are cyclically raised and lowered in a reciprocating and repetitive manner relative to the support rails 26 and 27 at a rate corresponding to the pulse rate of the hose 57.

In operation, a palletized load 12 is deposited on the transporter or conveyor 21 at the input end 22 thereof, such as by a forklift truck. As the hoses 57 of the transporter are cyclically inflated and deflated, the advancing arrangements 37 in rails 26 and 27 are also cyclically raised and lowered in a repetitive fashion. During raising, the trolleys 45 which are engaged with the underside of the pallet (preferably a minimum of two or three trolleys will be engaged with each pallet) are lifted upwardly so as to lift the pallet upwardly a small distance above the support surfaces 34. The weight of the pallet thus causes the trolleys 45 to roll forwardly by gravity along the downward incline of the declining surfaces 44, thereby forwardly advancing the pallet through a small steplike distance which may be in the order of about three inches to about six inches. The forward advancing of the pallet, due to rolling movement of the trolleys downwardly along the declining surfaces, will continue either until the declining movement of the trolleys causes the pallet to reengage the support surfaces 34, or until the hose 57 is deflated and lowers the pallet back into engagement with the support surfaces 34.

Once the hose 57 is deflated and the pallet 12 repositioned on the support surfaces 34, the continued deflation of the hose 57 tends to effect further lowering of the trolleys 45 away from the underside of the pallet, whereupon the springs 53 then urge the respective trolleys upwardly along the respective declining surfaces 44 back toward their uppermost position whereby the upper surfaces 54 thereof are again contacted with the underside of the pallet.

The system is then in a position to repeat the cycle in that the hoses are again inflated so that the trolleys again lift the pallet away from the support surfaces and then permit a forward gravity-urged step-like advance of the pallet in the same manner as described above.

Due to this continuous cyclic pulsing of the hoses 57, and the corresponding cyclic actuation of the load advancing arrangements 37, a palletized load can be moved forwardly along the conveyor in a steplike fashion. This forward stepping of the load will continue until the load abuts against a stationary object, such as a front stop or the next forwardly positioned pallet.

For example, if no other pallets are positioned forwardly on the conveyor, then the pallet will be moved forwardly until it contacts a stop disposed at the forward end of the bay. This stop will hold the pallet horizontally stationary, even though the pallet may continue to cycle up and down in response to the pulsing of the inflatable hoses. The pallet is then in a position to be removed when desired, such as by use of a forklift.

On the other hand, if several pallets are arranged in abutting contact rearwardly away from the output end of the conveyor, then pallets which are supplied to the input end will be conveyed forwardly only until they abut the next frontmost stationary pallet. However, when the frontmost pallet as disposed directly at the output end is removed, then continued cyclic movement of the advancing arrangement causes all of the pallets to advance forwardly in a steplike manner until the leading pallet again contacts the front stop.

With the arrangement of this invention, since the support rails and the conveying structure associated therewith all extend horizontally from the input end to the output end, the pallets themselves remain in a horizontal orientation at all times, even during the lifting and lowering thereof due to the pulsing of the hoses, and also during the forward advance thereof as the trolleys move downwardly along the declining ramps. Thus, the articles or goods supported on the pallets also remain horizontal, and thus are not subjected to tilting or tipping forces induced or created by an inclined orientation of the pallet.

The system for controlling and pulsing the inflatable hoses is conventional, having been extensively utilized on the inclined gravity conveyors shown in the patents mentioned above, so that further description of such system is believed unnecessary.

Embodiment of FIGS. 7-11

FIGS. 7-11 illustrate a load advancing arrangement 37' according to the present invention, which arrangement 37' is a variation of the arrangement 37 described above. More specifically, this load advancing arrangement 37' is defined by a plurality of load advancing modules 61 which are individually of short longitudinal length, with a large plurality of such modules 61 being coupled longitudinally so as to define the overall length of the load advancing arrangement 37'. Each module 61 includes a longitudinally elongate ramplike rail or runway segment 62 for cooperation with a respective car or trolley 63. The ramp segments 62 are designed to couple end-to-end longitudinally throughout the length of the conveyor to hence define the elongate runway 38'.

The runway segment 62 includes a longitudinally elongate center part 64 having end elements 65 and 66 fixed to opposite ends thereof. The center part 64 has a pair of sidewardly-spaced, upwardly facing guide tracks or rails 67 extending longitudinally along the upper surface thereof, which guide tracks have guide rims 68 extending along opposite sides thereof for providing more positive confinement of the rollers (described below) associated with the trolley 63. These guide rails 67 are inclined or sloped downwardly at a small angle relative to the horizontal as they project forwardly toward the output end of the conveyor, which downward slope is normally in the range of about 2° to about 5°.

The end block 65 at the upstream or higher end of the guide rails 67 defines thereon an abutment 69 which projects upwardly above the adjacent end of the guide rails and defines thereon a stop surface 71 which is of a concave configuration preferably generated on a radius which substantially corresponds to the outer radius of the rollers on the trolley 63. The other or downstream end block 66 has a similar upwardly projecting abutment 69' defining thereon a similar stop surface 71' for limiting the downward travel of the trolley along the rails 67.

To permit the runway segments 62 to be rigidly secured in longitudinally aligned end-to-end relationship, the rail segments are provided with an interfitting tongue-and-groove arrangement. For example, the upstream end block 65 is provided with a transversely extending groove 72 opening longitudinally inwardly from the end face thereof, and the downstream end block 66 has a platelike flange or tongue 73 fixed thereto and projecting outwardly from the end face in the downstream longitudinal direction. The tongues or flanges 73 and grooves 72 on longitudinally adjacent runway segments 62 hence slidably but snugly longitudinally innerfit to create a rigid and fixed relationship to enable the runway segments to be coupled end-to-end, and hence permit the assembled runway 38' to be vertically raised and lowered as a unit.

The trolley 63 includes a horizontally enlarged platelike top support pad structure 74 disposed for direct load-bearing engagement with the underside of a load, such as a pallet. This pad structure includes a top platelike pad 75 having an upper surface 76 intended for direct engagement with the underside of the load, which upper surface is preferably of a slight convex or rounded configuration in the longitudinal extent, as described relative to FIGS. 4-6. This top pad 75 is fixedly secured, typically by screws or rivets, to a platelike bottom pad 77 which comprises a part of the main support carriage for the trolley 63. This carriage includes three generally parallel but sidewardly spaced side plates or flanges 78 which are fixed to and project downwardly from the bottom pad 77. Each adjacent pair of side plates 78 has a pair of conventional rollers 79 positioned therebetween, which rollers are rotatably supported on suitable axles or pins which extend perpendicularly between the side plates 78. The trolley hence has pairs of front and rear rollers 79 which rollingly engage the pair of rails 67 to thereby provide for stable rolling engagement therewith.

The middle side plate 78 has, at the upstream end thereof, a flange part 82 which projects downwardly into and through a narrow slot 83 which opens downwardly between the guide rails 67. The narrow slot 83 extends throughout the length of the center block 64 and this slot, at its lower end, is of enlarged cross section to confine therein an elongate coil-type compression spring 84. This spring 84 has one end thereof abutting against and hence anchored relative to the downstream end block 66, whereas the other end of spring 84 bears against the downwardly projecting flange part 82 provided on the trolley carriage. The spring 84 hence normally urges the trolley upwardly along the rails 67 into an upstream position wherein the rollers 79 abut the stop 71.

Figure 9:
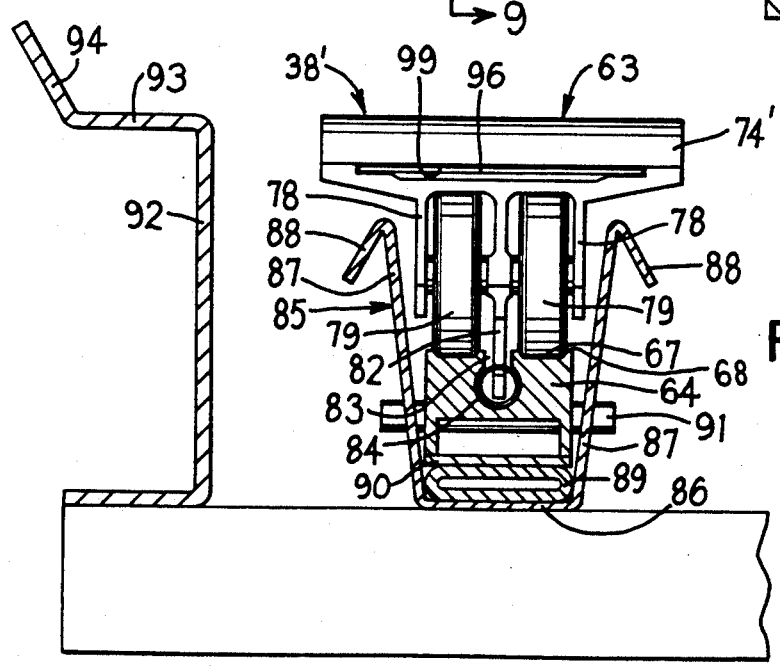
FIG. 9 is an enlarged sectional view taken generally along line IX—IX of FIG. 7.

The raceway 38' is preferably provided within its own support channel 85 which, as illustrated in FIG. 9, is generally upwardly opening and has a bottom wall 86 adapted to be fixedly secured to and supported on appropriate stationary cross beams associated with the supporting frame, such as the frame of a storage rack. The bottom wall 86 joins two upwardly projecting side legs 87 which preferably have upper flanges 88 which project outwardly but are slopped downwardly. The runway arrangement 38' is disposed within the upwardly opening support channel 85 so that the runway arrangement is supported on a lifting device, such as an elongate inflatable air hose 89, as disposed within the bottom of the support channel. If necessary, a substantially continuous elongate but vertically thin intermediate plate 90 can be interposed between the hose and the bottom of the runway 38'. A pin 91 is mounted on and projects transversely through each runway segment 62, with the ends of this pin 91 projecting through suitable vertically elongate slots (not shown) formed in the opposed side legs 87 for permitting limited vertical raising and lowering of the runway arrangement 38'.

In this variation as shown by FIG. 9, the overall frame of the conveyor or storage rack will also preferably be provided with a support rail 92 positioned sidewardly adjacent the outer side of each load advancing arrangement 37'. This support rail 92 is also preferably fixedly secured to the cross supports and projects upwardly therefrom. The support rail 92 defines, at the upper portion thereof, a generally horizontal support flange 93 which is of limited sideward extent but which extends substantially continuously throughout the longitudinal extent of the conveyor. Flange 93 hence defines thereon an upper support surface adapted for supportingly engaging the underside of the pallet. The upper surface of this support flange 93 is at an elevation similar to or only slightly above the elevation of the upper surface 76 of the trolley when the latter is at or adjacent its upstream position and the hose 89 is deflated. Support rail 92 also preferably has an inclined centering flange 94 fixed to the outer edge of the support flange 92 and projecting outwardly at an upward incline. These flanges 93-94 function in the same manner as the flanges 33 and 35 of FIG. 6.

To prevent contaminants such as dirt and other material and objects from gaining access to the support channel 85, the load advancing arrangement 37' is also provided with a shielding structure 95 disposed above and positioned longitudinally along the support channel 85. This shielding structure 95 comprises an elongate dirt shield member 96 which is of a thin and flexible sheetlike material, such as a plastic or fabric sheet. This dirt shield 96 extends longitudinally throughout the length of the load advancing arrangement 37' and has opposite ends thereof anchored to stationary frame elements 97. This anchoring connection preferably is through a suitable tension spring 98 at one, and preferably both, ends of the dirt shield 96. To provide for positioning and control of the dirt shield 96, the pad structure 74 associated with each trolley 63 has a vertically narrow but sidewardly horizontally elongated tunnel-like slot 99 extending longitudinally through the pad structure at the interface between the top and bottom pads 75 and 77, respectively. The side edges of slot 99 are suitably closed by the pad structure, whereby the slot hence has a width which is similar to but only slightly larger than the width of the dirt shield 96. The end edges which lead into and discharge from the slot 99, as defined on the top and bottom pads, are preferably rounded so as to minimize wear on the dirt shield. This tunnel-like slot 99 hence enables the trolley 63 to relatively move back and forth during normal movement of the load advancing system, and hence permit the pad structure 74 to slidably reciprocate relative to the dirt shield 96. In addition, the flexibility of the dirt shield 96, coupled with the resilient support thereof by the springs 98, enable the dirt shield 96 to both deflect and vertically move in response to changes in elevation of the trolleys 63. At the same time, the trolleys always maintain the dirt shield 96 positioned centrally over but properly supported upwardly in spaced relationship above the support channel 85 to prevent dirt and other contaminants from entering the channel. As illustrated by FIG. 9, the dirt shield 96 has a width greater than the mouth of the channel 85 to hence severely restrict access to the channel.

While the load advancing arrangement 37' has been illustrated by FIG. 9 as utilizing a separate support channel 85, it will be appreciated that this load arrangement 37' could also be positioned directly within a channel of the type illustrated by FIG. 6 if desired. In such instance the arrangement 37' would, however, have to fit totally within the interior of the channel.

The operation of the load advancing arrangement 37' occurs in the same manner as described above relative to the arrangement 37, specifically due to the application of a pulsating air supply to the activating hose 89. Further detailed description as to the operation relative of the arrangement 37' is thus believed unnecessary.

Figure 10:
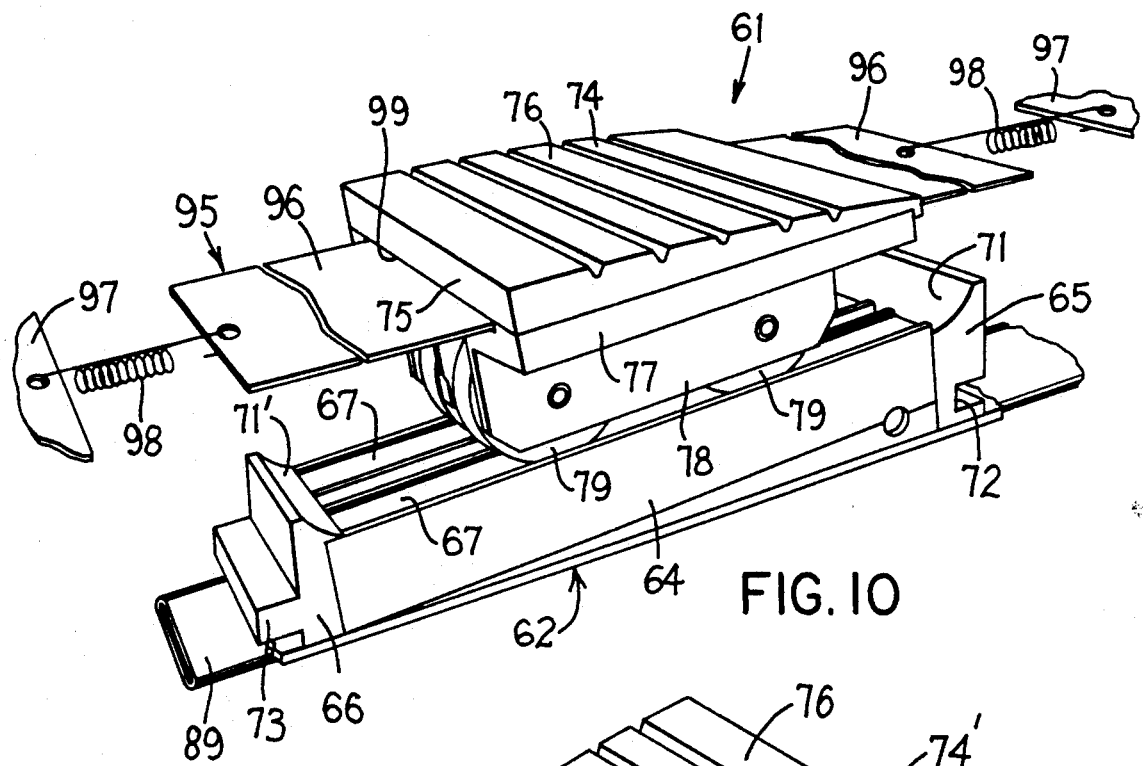
FIG. 10 is a fragmentary perspective view illustrating one of the runway segments or modules associated with the conveyor of FIGS. 7-9.
Figure 11:
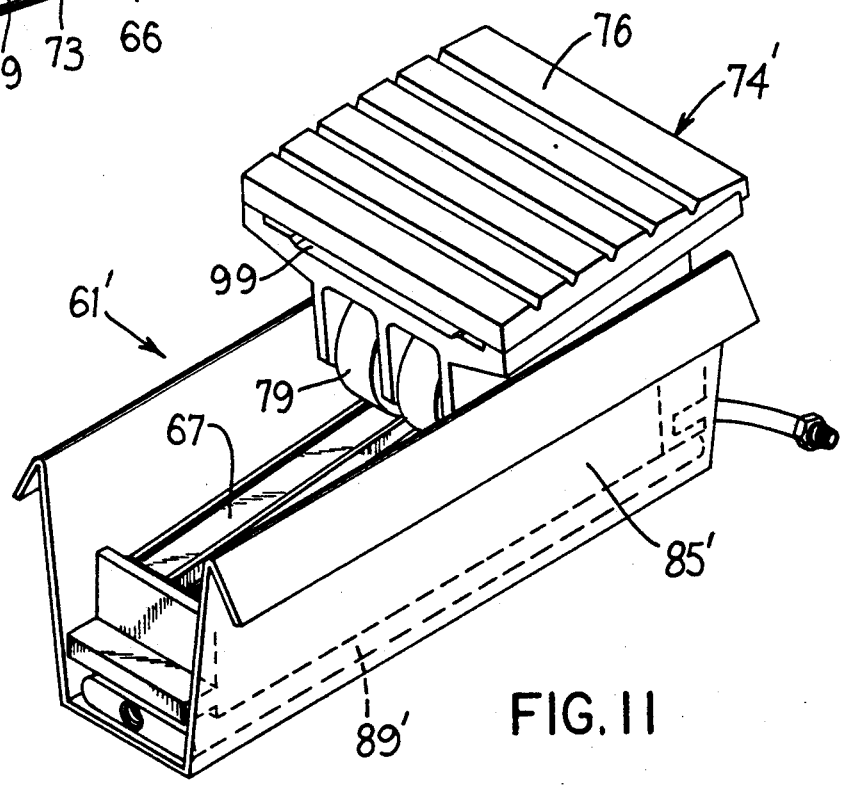
FIG. 11 is a perspective view similar to FIG. 10 but illustrating a variation wherein each runway module has its own separate lifting hose.

Referencing FIG. 11, there is illustrated a runway module 62' which substantially corresponds to the module 62 of FIG. 10. The arrangement of FIG. 11, however, is provided with a separate short inflatable air hose segment 89' associated with each module 62', rather than use of the continuous elongate hose. In this situation the numerous short hoses associated with the plural modules are connected to a common supply conduit. In addition, the module 62' also employs a support channel segment 85' which is of a length corresponding to the length of the module, whereby these support channel segments 85' are also assembled together end-to-end when the modules are assembled in aligned relationship.

The modified module of FIG. 11 hence permits the entire module, including the activating hose 89' and the support channel 85', to be manufactured and factory assembled as a very small and compact module, and then a plurality of such modules shipped to the job site for final assembly so as to create the overall elongate load advancing apparatus.

Figure 12:
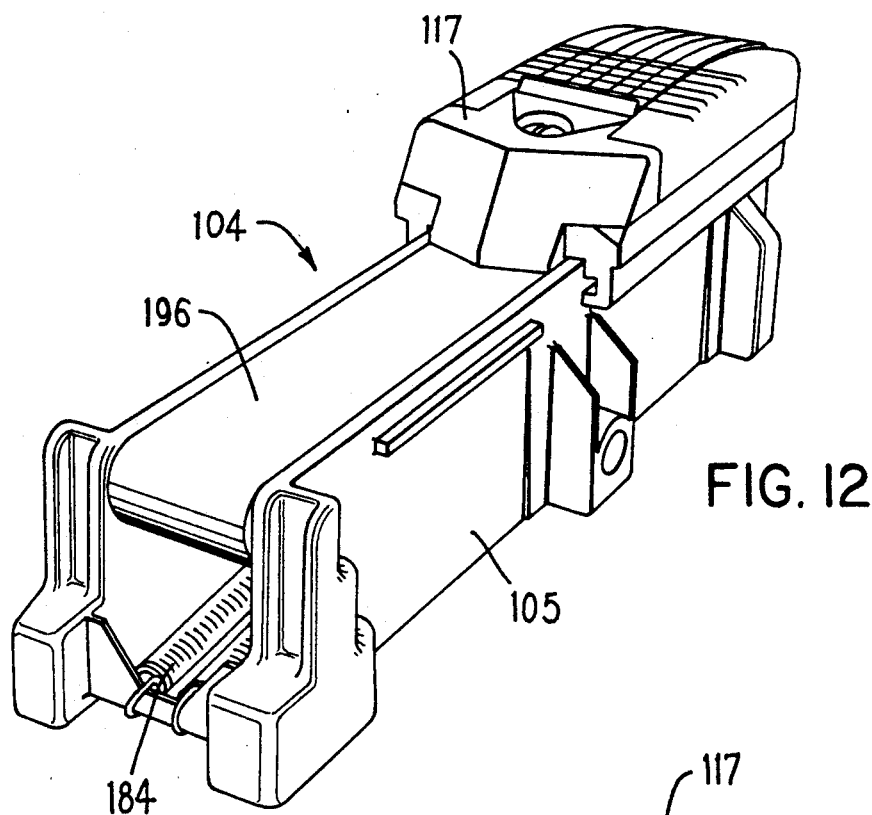
FIG. 12 is a perspective view of a further embodiment of a runway module for use in a level gravity conveyor according to the present invention.
Figure 13:
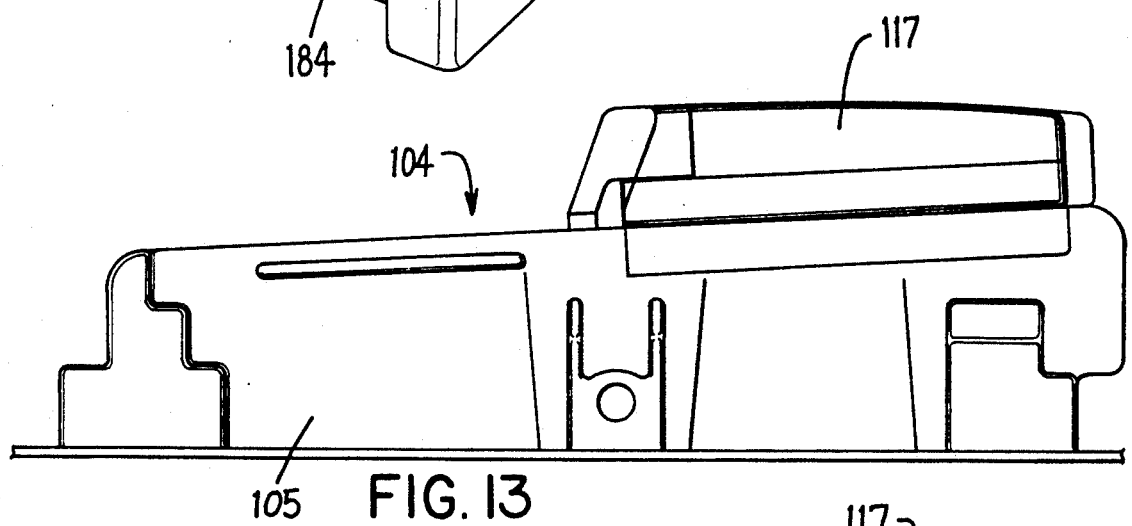
FIG. 13 is a side elevational view of the runway module of FIG. 12.
Figure 14:
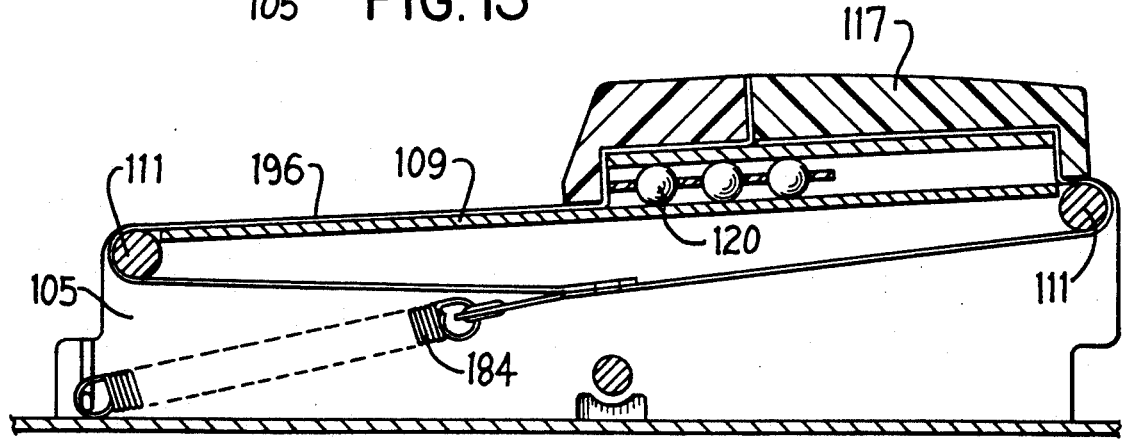
FIG. 14 is a longitudinal sectional view of the runway module of FIGS. 12 and 13.
Figure 15:
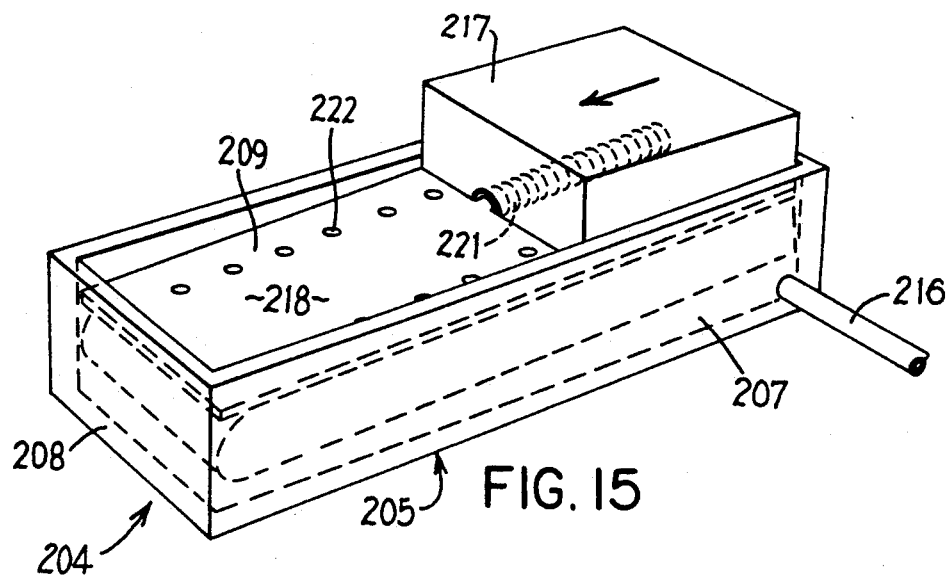
FIG. 15 is a perspective view of a further embodiment of a runway module for use in a level gravity conveyor according to the present invention.
Figure 16:
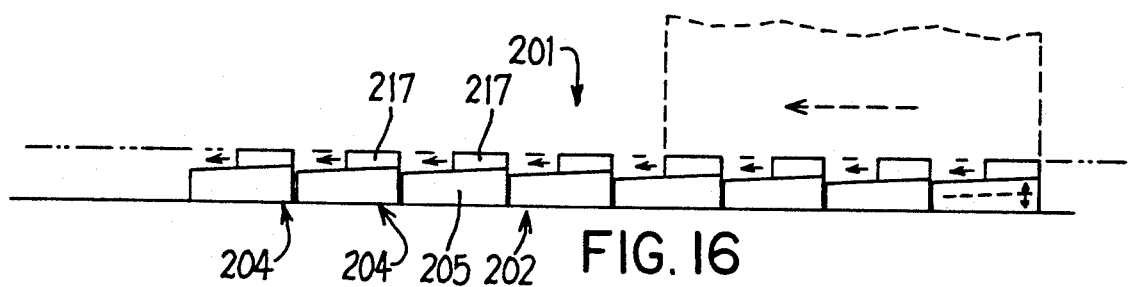
FIG. 16 is a side elevational view diagrammatically illustrating the longitudinal extent of the conveyor employing the module of FIG. 15.
Figure 17:
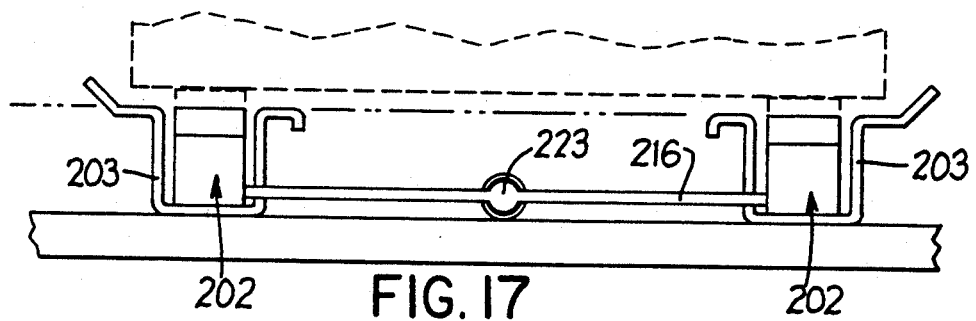
FIG. 17 is an enlarged fragmentary view illustrating how the conveyor of this variation can be associated with the bay of a storage rack.
Figure 18:
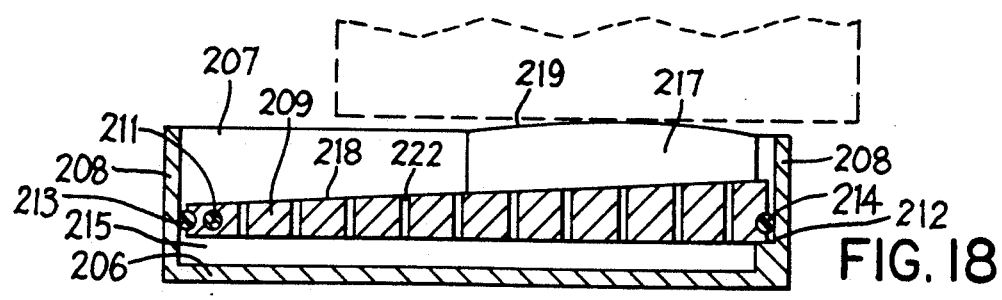
FIG. 18 is a sectional elevational view of the module of FIG. 15.

Embodiment of FIGS. 12–14

FIGS. 12–14 illustrate a variation of a load-advancing runway or track module 104 which cooperates to define an elongate runway in the same manner as the modules 62 shown in FIGS. 7–10 when plural such modules are stationarily positioned in end-to-end relationship within the rail.

The module 104 comprises a generally hollow boxlike housing 105 which can be open on the bottom side thereof, and includes a top wall 109 which functions as a runway segment which joins between the side walls of the housing and is slightly inclined downwardly as it projects forwardly (that is, in the downstream direction). A pair of guide rods 111 of generally cylindrical outer configuration, which rods can be rotatably supported on the housing side walls if desired, extend transversely across the housing in generally parallel relationship so as to be adjacent and substantially tangential with respect to the opposite ends of the runway wall 109. A load-engaging trolley or support pad 117 is disposed for rolling engagement on the runway segment 109. This pad 117 is, in this illustrated embodiment, supported on a ball-bearing carriage 120 which in turn rollingly engages the runway wall 109, although it will be appreciated that the pad can be provided with rollers mounted directly thereon if desired similar to FIGS. 1–6. The pad 117 is coupled to a flexible sheetlike dirt shield or seal 196 which, in conjunction with the pad, effectively forms an endless loop. This dirt shield is designed so as to cover the runway wall 109 and prevent it from being contaminated with dirt and the like. This dirt shield has an upper segment which projects in the downstream direction and then wraps around the downstream guide rod 111, whereupon the dirt shield then has a lower reach which projects rearwardly and wraps around the upstream guide rod 111 for reconnection to the support pad 117. As the support pad reciprocates back and forth on the runway segment 109, the dirt shield always covers the runway wall 109. Further, any dirt which collects on the upper side of the dirt seal tends to be moved and discharged over the adjacent guide rod 111.

In this embodiment, the lower reach of the dirt seal 196 is also preferably coupled to a biasing structure in the form of a spring 184 which has the other end anchored to the housing so as to impose a biasing force on the dirt shield which, due to its engagement with the pad, always urges the pad toward its upstream raised position.

The housing again preferably has a projecting tongue and cooperating recess at opposite ends so that adjacent aligned modules can be interfitted in the same manner as described above.

The plurality of modules are again supported on a cyclic vertical displacing structure, such as an inflatable hose, with the modules and hose being confined within suitable rail structure similar to those described above.

The overall operation of this embodiment is the same as the embodiments described above, so that further detailed description thereof is believed unnecessary.

Embodiment of FIGS. 15–18

FIGS. 15–18 illustrate a further variation of a load-advancing conveying apparatus 201 according to the present invention. This apparatus again includes an elongate runway or trackway defined by a plurality of runway segments extending longitudinally throughout the length of the conveying apparatus, which segments are vertically movable and each support thereon a movable load-engaging pad which moves forwardly a small amount due to urging of gravity when the runway segments are raised upwardly in an inclined relationship.

More specifically, this conveying arrangement 201. includes a track or runway structure 202 which is horizontally elongated and extends throughout substantially the entire horizontal length of each of the horizontally-extending support rails 203, which rails in this illustrated embodiment are substantially identical to the rails 26 and 27 of FIG. 2. The runway structure 202 is defined by a plurality of runway or track modules 204 which are stationarily positioned in end-to-end relationship within the rails 203 so as to extend substantially between the input and output ends of the arrangement.

Each runway module 204 comprises a generally upwardly-opening boxlike housing 205 defined by a bottom wall 206, opposed generally parallel upright side walls 207, and opposed generally parallel upright end walls 208 extending between the side walls 207. The top side of the boxlike housing 205 is generally open.

A runway segment 209 is positioned within the interior of each housing 205, which segment is of a platelike construction and snugly fits within and extends substantially entirely across the horizontal cross section of the housing 205. This runway segment at the downstream end thereof is supported by a pivot 211 which mounts to the adjacent side walls 207 near the front or downstream end of the housing, whereby the runway segment 209 is hence vertically pivotally swingable about the axis of pivot 211. The other end of runway segment 209, namely the free end as disposed adjacent the upstream end of the housing, rests against a housing stop 212 when the runway segment is in a lowermost position, in which position the runway segment is either substantially horizontal or only slightly downwardly inclined in the forward direction. Suitable elastomeric sealing elements cooperate between the runway segment 209 and the adjacent inner surfaces of the housing walls. For example, elastomeric seal elements 213 and 214 are mounted on opposite ends of the runway segment 209 for engaging the opposed end walls. Further elastomeric seal elements (not shown) are mounted and extend longitudinally along opposite sides of the runway segment 209 for sealing engagement with the opposed side walls 207. The runway segment 209 is hence sealingly engaged with the housing and is normally spaced upwardly a small distance from the bottom wall 206 to thereby define a pressure chamber 215 beneath the runway segment. This pressure chamber is in communication with an air inlet 216, the latter being coupled to a suitable conduit which in turn couples to a pulsating source of pressurized air, similar to that described with respect to the embodiment shown in FIG. 4. Each runway module 204 also includes a load-engaging trolley or pad 217, the latter being confined between the side and end walls of the housing and slidably supportingly engaged on the upper surface 218 of the runway segment 209. The pad has an upper surface 219 adapted for engagement with the underside of a load, such as a pallet, which surface 219 is again preferably provided with a convex rounded configuration in the longitudinal direction of the conveyor. The underside of the load engaging pad 217 is provided with a recess in which is accommodated a tension spring 221, which spring has one end anchored to the pad 217 adjacent the downstream end thereof, and the other end anchored to the runway segment 209 adjacent the free end thereof. This spring 221 always biases the pad 217 toward an upstream position, namely toward the higher end of the runway surface 218 when the runway segment is inclined.

The runway segment 209 preferably has a plurality of small openings or orifices 222 projecting vertically therethrough at uniformly spaced intervals longitudinally therealong. These orifices communicate with the pressure chamber 215 and open upwardly through the upper runway surface 218. Hence, when the pad 217 is supported on and/or moves along the runway surface 218, at least some of the orifices 222 will always be covered over by the lower surface of the pad 217. The pressurized air within the chamber 215, acting through these orifices, hence create a thin air film, namely an air bearing between the runway surface 218 and the under surface of the pad 217 so as to facilitate the forward advancing of the pad 217 downwardly along the incline surface 218 when the pad is engaged with and effecting forward advancing of a load.

In operation, the springs 221 normally maintain the pads 217 of the modules in upstream positions wherein the upper surfaces 219 of the pads may be engaged with or positioned only slightly downwardly from the under surface of the load. Further, in this position the runway segments 209 will be maintained in a lowered position. When advancing of the load is desired, then pressurized air is supplied through the main manifold or supply conduit 223 into the branch inlets 216 and thence into the pressure chambers 215 of the various modules. This hence causes the runway segments 209 to swing upwardly about the pivots 211, whereby the runway surfaces 218 hence are inclined downwardly in the forward direction and, since the upward pivoting of the runway segments causes the pads 217 to engage and upwardly lift the load, the pads then slide forwardly and downwardly along the surfaces 218 to hence forwardly advance the load until the load again engages the flanges on the support rails 203. The air system is then at least partially depressurized to depressurize the chambers 215, whereby the runway segments swing downwardly, and the springs 221 resiliently return the pads 217 back to the upstream positions so as to be in a position to permit initiation of a further cycle of operation.

The modules will be pressurized in a cyclic manner so as to permit the loads to be forwardly advanced in an intermittent steplike manner corresponding to the operation described above relative to the other embodiments.

In this variation, the pressure chamber could be provided with an inflatable bladder confined therein and maintained in communication with both the pressure source and the manifold in the runway segment 209 so as to provide for containment of the pressured air. Use of a bladder would eliminate the need for seals running along the edges of the pivotal runway segment.

Figure 19:
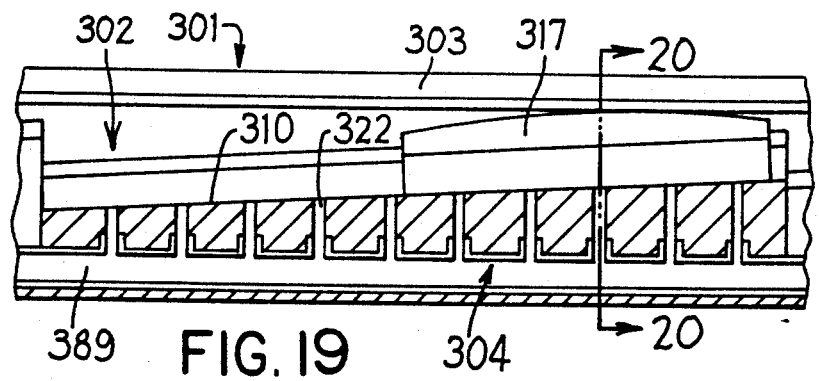
FIG. 19 is a side elevational view, partially in cross section, illustrating a still further embodiment of a runway module for use in a level gravity conveyor according to the present invention.
Figure 20:
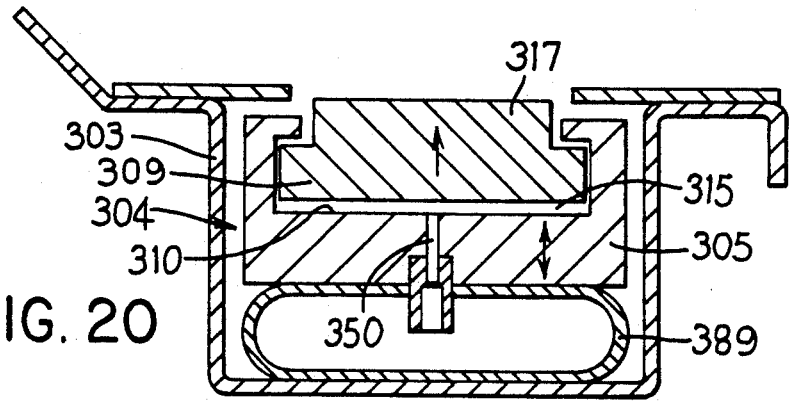
FIG. 20 is a cross sectional view of the module shown in FIG. 19.
Figure 21:
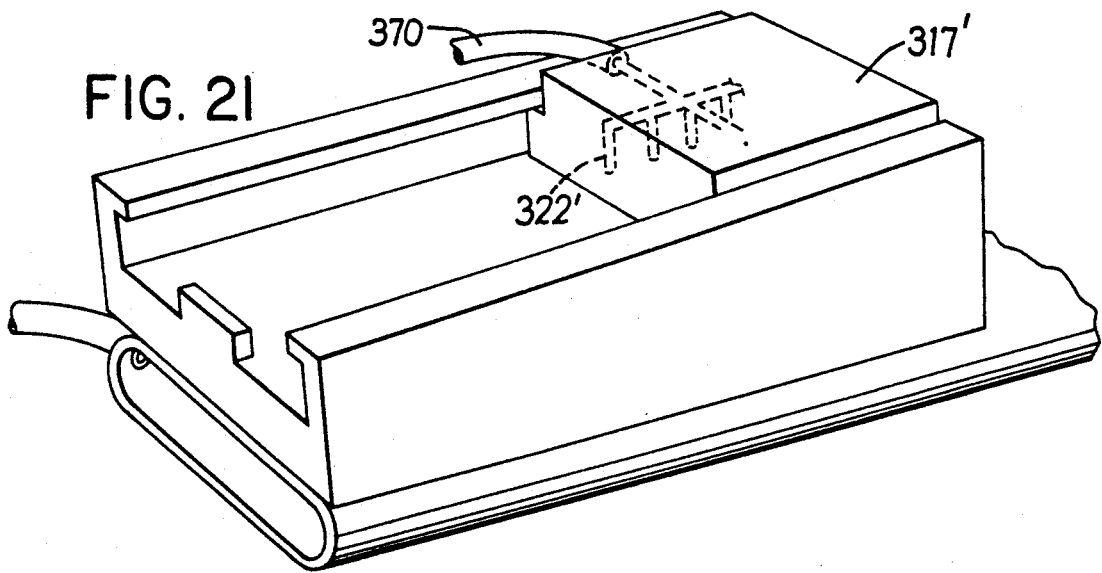
FIG. 21 is a view similar to FIG. 19 but illustrating a variation in the module.

Embodiment of FIGS. 19-21

FIGS. 19-20 illustrate a further variation of a load-advancing conveying apparatus 301 which includes a track or runway structure which is defined by a plurality of aligned and adjacent runway modules 304 which extend longitudinally throughout the length of a horizontally-extending support rail 303. The module 304 comprises a boxlike housing 305 which is vertically movably supported between the side walls of the rail 303 and defines therein an upwardly opening chamber 315 in which the platelike support pad 317 is slidably supported. The support pad 317 is slidably supported on the top wall 310 which is inclined downwardly at a small angle as it projects longitudinally forwardly and functions as a runway segment 309. A spring (not shown) normally coacts with the support pad 317 for normally urging it into an upstream position wherein it is disposed on the raised end of the wall 310.

The series of modules 304 are supported on an inflatable hose 389 which extends longitudinally throughout the support rail and is normally subjected to a cyclic inflation-deflation cycle in the same manner as described above. This hose also has a connection joined to the underside of the module housing for communication with an air manifold passage 350 formed in the module housing, the latter communicating through a plurality of small passages or orifices 322 with the bottom surface of the chamber. This permits a limited quantity of pressurized air to bleed into the region between the bottom surface of pad 317 and the upper surface 310 to create an air bearing to facilitate forward movement of the support pad and load downwardly along the inclined raceway surface when the module is displaced upwardly due to inflation of the hose.

The variation illustrated by FIG. 21 is similar to the variation of FIGS. 19–20 except that air supply for the air bearing communicates directly with the support pad 317'. For example, the support pad 317' is provided with a manifold passage internally thereof and the latter communicates with a plurality of orifices 322' which open downwardly through the bottom surface of the support pad 317'. This manifold passage is supplied with air through a small flexible conduit 370 which, at its other end, communicates with a pressure source, typically a separate air supply conduit which extends along the support rail. This conduit is cyclically supplied with pressured air from the same source as the hose, and hence air is supplied to the support pad to create an air bearing whenever the module is lifted upwardly by the hose.

The transporting or conveying arrangement illustrated by FIGS. 19–21 otherwise operates in the same manner as the arrangements described above, whereby further detailed description thereof is believed unnecessary.

While the embodiment of FIGS. 19–21 again illustrates use of springs for returning the support pads to the upstream positions, it will be appreciated that other return or biasing arrangements can be provided. For example, the support pad can be provided with a small piston-like part projecting sidewardly therefrom and slidably supported within a longitudinally-elongate opening formed within the module housing, which opening functions like a pressure cylinder when connected to a pressurized air source. With such arrangement, a small valve can be provided adjacent the downstream end of the module housing for actuation by the support pad when the latter reaches its forwardmost position, which valve when actuated supplies air to the opening to react against the pistonlike part to return the support pad back to its upstream position. Such arrangement would function in the manner of a conventional air spring for always returning the support pad to its upstream position.

Figure 22:
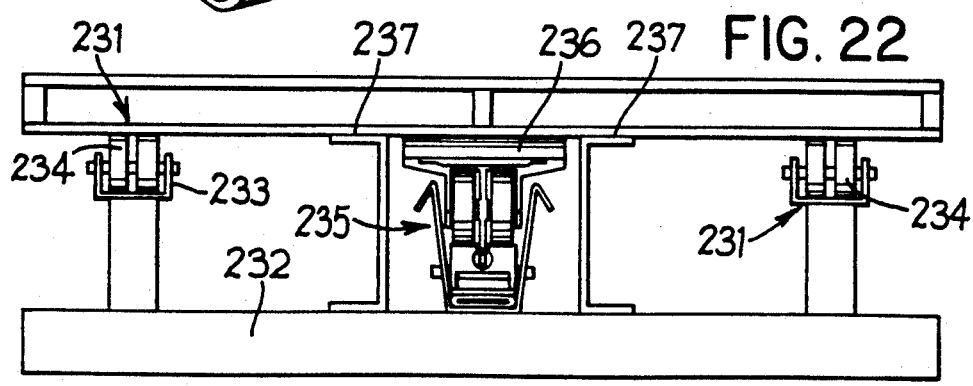
FIG. 22 is an enlarged fragmentary view similar to FIG. 3 but illustrating a variation wherein a single level gravity conveyor according to the present invention can be associated with and extent along a conveyor, such as along the bay of a storage rack.

Embodiment of FIG. 22

Figure 3:
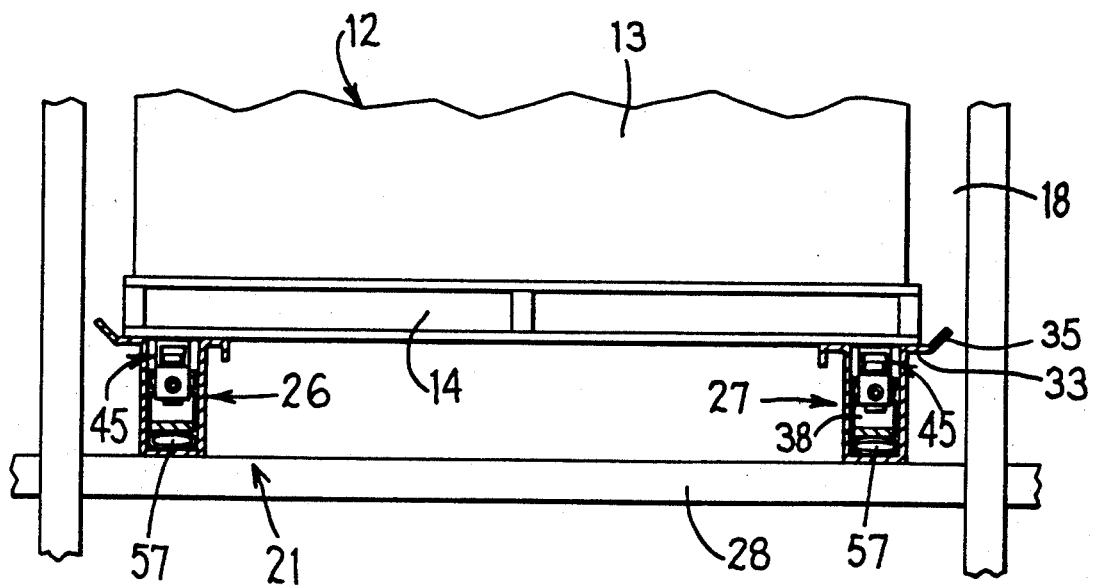
FIG. 3 is an enlarged fragmentary view which illustrates a conveyor as associated with one bay of the rack, and having a palletized load associated therewith.
Figure 7:
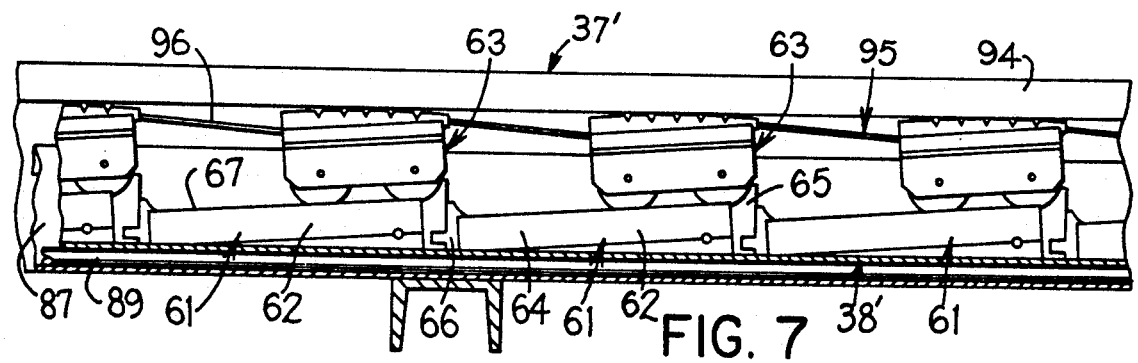
FIG. 7 is a side elevational view similar to FIG. 4 but illustrating a second and preferred embodiment of the improved level gravity conveyor of the present invention.
Figure 8:
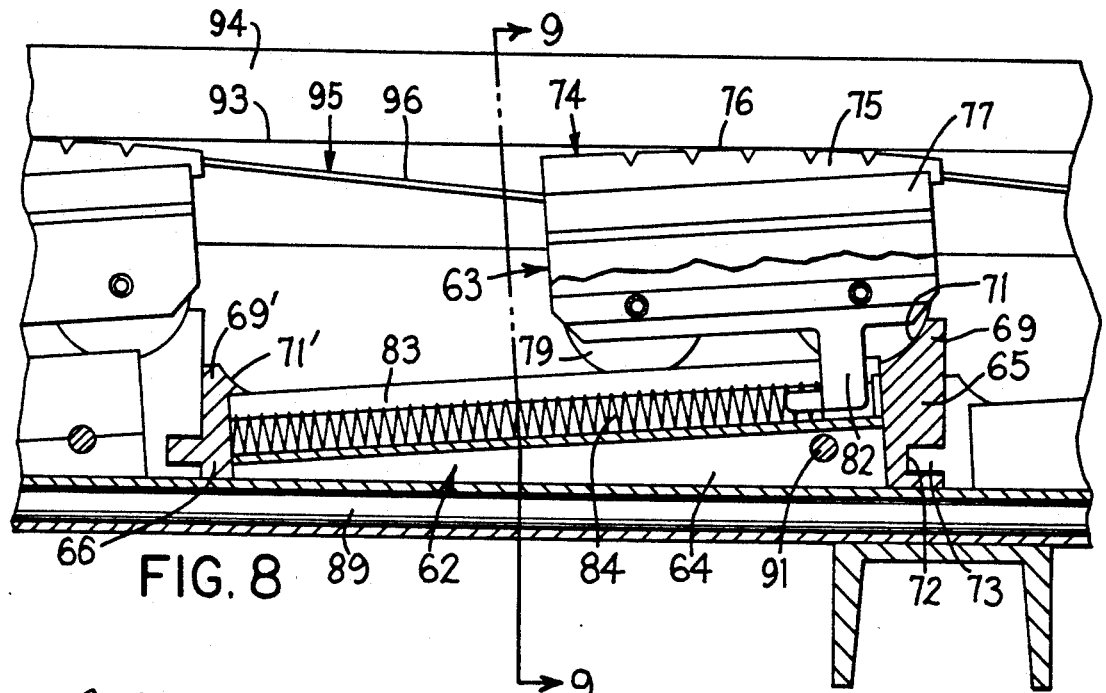
FIG. 8 is an enlarged, fragmentary elevational view, partially in cross section, illustrating one of the trolleys associated with the conveyor of FIG. 7.

FIG. 22 is a transverse cross-sectional view similar to FIG. 3 but illustrating a modified conveying arrangement suitable for use either as a conveyor or for incorporation into a storage rack. In this modification, the palletized loads are supported adjacent opposite sides by a pair of generally parallel and horizontally extending roller supports 231 which, in a conventional manner, are secured on the frame by appropriate cross members or beams 232. Each of the roller supports 231 includes a horizontally-elongated upwardly-opening support channel 233 in which are supported a plurality of conventional rollers or skate wheels 234 for engaging the underside of the load adjacent one longitudinally extending edge thereof. These rollers 234 are disposed in uniformly spaced relationships throughout the horizontal length of the conveyor apparatus, whereby the rollers as associated with the two roller supports 231 hence define a substantially horizontally extending support plane for the loads.

Positioned midway between and in substantially parallel relationship with the roller supports 231 is a horizontally-elongated load-advancing arrangement 235, which arrangement extends horizontally throughout the length of the conveyor and includes a plurality of longitudinally spaced load-engaging pads or trolleys 236 which again individually cooperate with declining runway segments for permitting the loads to be lifted and then forwardly advanced in a steplike manner by gravity. The load advancing arrangement 235 may correspond to and structurally and functionally cooperates in the same manner as any of the arrangements (such as 37 or 37') described above.

With this variation of FIG. 22, only a single load advancing arrangement is necessary for association with each conveyor, which arrangement can be positioned so as to extend under the middle of the loads to effect, to at least a significant degree, a balanced upward lifting of the load when advancing is desired. Further, even though the load may tilt sidewardly when the pads lift the loads upwardly away from brake surfaces 237, nevertheless any such tilting is of small extent and stability is maintained since the loads will continue to engage at least one of the roller supports 231.

While a highly preferred utilization of the improved conveyor or transporter of the present invention is its incorporation into a first in-first out storage rack system employing several bays stacked vertically on top of one another, with each bay employing one of the transporters therein for forwardly advancing and storing loads, nevertheless it will be understood that the improved transporter can also be desirably utilized in nonstorage rack applications, such as more conventional conveying applications.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A level gravity-type transporting apparatus for transporting loads along a predetermined direction, comprising:

a support structure extending longitudinally parallel to the direction of load movement, said support structure extending horizontally from an input end to an output end, said support structure defining an upwardly facing and substantially longitudinally elongated support surface extending substantially horizontally longitudinally for supportive engagement with loads;

runway means extending horizontally of said support structure for defining a plurality of ramplike members which are disposed horizontally in series along the longitudinal extent of said support structure, each of said ramplike members having an upwardly facing surface which declines as it projects forwardly toward the output end;

a plurality of separate and independently movable load-advancing pad units movably supported on said runway means at longitudinally spaced intervals therealong, each said pad unit being movably supported on one of the declining surfaces and having an upwardly facing surface adapted for supportive engagement with an underside of a load, and means for urging the pad units into an uppermost position along the respective declining surface for engagement with the underside of the load when the load is engaged with the support surface, and;

lifting means for causing cyclic raising and lowering of the pad units relative to the support structure according to a repetitive pattern to effect lifting of the loads away from the support surface, following which the loads and the pad units which are engaged therewith are moved forwardly by gravity due to the pad units moving forwardly and downwardly along the respective declining surfaces to permit a forward steplike advancing movement of the loads.

2. An apparatus according to claim 1, wherein said ramplike members are vertically movable relative to said support structure and are cyclically vertically raised and lowered by said lifting means.

3. An apparatus according to claim 2, wherein said pad unit is movable forwardly along the respective declining surface through a distance in the range of from about three inches to about nine inches.

4. An apparatus according to claim 2, wherein each said pad unit is rollingly supported on the respective ramplike member.

5. An apparatus according to claim 2, including means for defining an air bearing cooperating between said pad unit and the respective ramplike member for facilitating forward movement of the pad unit along the respective ramplike member.

6. An apparatus according to claim 2, wherein said lifting means includes an inflatable air hose structure supportingly engaged between said support structure and said runway means for effecting cyclic raising and lowering of the runway means.

7. An apparatus according to claim 2, wherein said lifting means includes an air pressure chamber associated with and disposed under each said runway member for effecting cyclic raising and lowering thereof.

8. An apparatus according to claim 2, including dirt shield means cooperating with said runway means and disposed above the declining surfaces for preventing deposit of dirt and contaminates on said declining surfaces.

9. An apparatus according to claim 8, wherein said dirt shield means includes a thin and flexible sheetlike shield member which projects in upstream and downstream directions from the respective pad unit for overlying the respective declining surface.

10. An apparatus according to claim 8, wherein said dirt shield means includes an elongate thin and flexible sheetlike shield member extending longitudinally throughout the length of said elongate runway means, said shield member extending between but at an elevational slightly below the upwardly facing surfaces of said pad units, said shield member extending longitudinally through suitable clearance spaces provided in the respective pad units for permitting the pad units to move forwardly and rearwardly relative to the respective runway members independently of the shield member.

11. An apparatus according to claim 10, wherein the elongate shield member has opposite ends thereof anchored relative to the support structure, at least one of said anchoring means including spring means for tensioning the shield member while enabling vertical deflection thereof.

12. An apparatus according to claim 2, wherein said runway means is defined by a plurality of separate runway modules each defining thereon a said runway member, said runway modules being disposed in adjacent and longitudinally aligned relationship throughout the length of said runway means.

13. An apparatus according to claim 12, wherein said modules each include a rigid housing having said runway member as a part thereof, the housing of adjacent runway modules having mating and interfitting structure which cooperates between adjacent ends of adjacent modules for preventing relative vertical separation between longitudinally adjacent modules.

14. An apparatus according to claim 13, wherein the lifting means includes an inflated air hose structure which is disposed under the modules for effecting cyclic raising and lowering thereof.

15. An apparatus according to claim 12, wherein each said module includes a rigid housing, said lifting means includes an air pressure chamber defined within the housing of each module and a lifting member vertically movably supported within each said housing for vertical cyclic displacement in response to cyclic pressurization and depressurization of the respective pressure chamber, said lifting member defining thereon said runway member.

16. An apparatus according to claim 15, including means for supplying pressurized air between said pad unit and the respective declining surface for defining an air bearing.

17. A level gravity-type transporting apparatus for transporting loads along a predetermined direction, comprising:

support rail structure extending longitudinally parallel to the direction of load movement, said rail structure extending horizontally from an input end to an output end, said support rail structure including an upwardly facing and substantially longitudinally uninterrupted support surface extending substantially horizontally longitudinally for supportive engagement with loads;

a vertical lifting device supported on and extending longitudinally of said support rail structure, and control means coupled to said lifting device for causing cyclic raising and lowering of the lifting device relative to the support rail structure according to a repetitive pattern;

load advancing means coupled with said lifting device for repetitive cyclic raising and lowering of the loads;

said load advancing means including a horizontally elongate runway extending horizontally of said support rail structure and movable vertically relative thereto, said runway being coupled to said lifting device for cyclic raising and lowering thereby relative to said support rail structure;

said runway including a plurality of ramplike segments which are disposed horizontally in series throughout the longitudinal extent of said support rail structure, each of said ramplike segments having an upwardly facing surface which declines as it projects forwardly toward the output end;

said load advancing means including a plurality of separate and independently movable pad units movably supported on said runway at longitudinally spaced intervals therealong, each said pad unit being movably supported on one of the declining surfaces and having an upwardly facing surface adapted for supportive engagement with an underside of the load, and means for urging the pad unit into an uppermost position along the respective declining surface for engagement with the underside of the load when the lifting device is in a lowered position and the load is engaged with the support surfaces;

whereby the lifting device effects raising of the runway and of the pad units to effect lifting of the loads away from the support surface, following which the loads and the pad units which are engaged therewith are moved forwardly by gravity due to the pad units moving forwardly and downwardly along the respective declining surfaces to permit a forward steplike advancing movement of the loads.

18. A storage rack system having a framework defining a plurality of adjacent columns each defining a plurality of vertically adjacent bays, and a gravity-type transporting apparatus associated with and extending longitudinally along each of a plurality of said bays for permitting gravity-urged movement of loads from an input end of the respective bay to an output end thereof, said transporting apparatus comprising:

a pair of sidewardly spaced and substantially parallel support rails extending longitudinally of said bay, said rails extending horizontally between said input and output ends, each said support rail defining thereon an upwardly facing and substantially longitudinally uninterrupted support surface extending substantially horizontally longitudinally of said bay for supportive engagement with the loads;

vertical lifting means supported on and extending longitudinally of said rails, and control means coupled to said lifting means for causing cyclic raising and lowering of the lifting means relative to the support rail according to a repetitive pattern;

load advancing means coupled with said lifting means for repetitive cyclic raising and lowering thereof;

said load advancing means including horizontally elongate runway means extending horizontally of said support rails and movable vertically relative thereto, said runway means being coupled to said lifting means for cyclic raising and lowering thereby relative to said support rails;

said runway means including a plurality of ramplike segments which are disposed horizontally in series throughout the longitudinal extent of said support rails, each of said ramplike segments having an upwardly facing surface which declines as it projects forwardly toward the output end;

said load advancing means including a plurality of separate and independently movable trolley units movably supported on said runway means at longitudinally spaced intervals therealong, each said trolley unit being movably supported on one of the declining surfaces and having an upwardly facing surface adapted for supportive engagement with an underside of the load, and means for urging the trolley unit into an uppermost position along the respective declining surface for engagement with the underside of the load when the lifting means is in a lowered position and the load is engaged with the support surfaces;

whereby the lifting means effects raising of the runway means and of the trolley units to effect lifting of the load away from the support surfaces, following which the load and the trolley units which are engaged therewith are moved forwardly by gravity due to the trolley units moving forwardly and downwardly along the respective declining surfaces to permit a forward steplike advancing movement of the load.

* * * * *